United States Patent
Doucet et al.

(10) Patent No.: US 11,698,016 B2
(45) Date of Patent: Jul. 11, 2023

(54) INTERNAL COMBUSTION ENGINE ARRANGEMENT

(71) Applicant: FEV Europe GmbH, Aachen (DE)

(72) Inventors: Matthieu Doucet, Aachen (DE); Hans-Jürgen Blessing, Aachen (DE)

(73) Assignee: FEV Europe GmbH, Aachen (DE)

( * ) Notice: Subject to any disclaimer, the term of this patent is extended or adjusted under 35 U.S.C. 154(b) by 0 days.

(21) Appl. No.: 17/707,788

(22) Filed: Mar. 29, 2022

(65) Prior Publication Data

US 2022/0307406 A1    Sep. 29, 2022

(51) Int. Cl.
*F01N 11/00* (2006.01)
*F01N 13/00* (2010.01)

(52) U.S. Cl.
CPC ............ *F01N 11/00* (2013.01); *F01N 13/008* (2013.01); *F01N 2550/02* (2013.01); *F01N 2560/024* (2013.01); *F01N 2560/025* (2013.01); *F01N 2560/06* (2013.01); *F01N 2900/1602* (2013.01)

(58) Field of Classification Search
CPC .... F01N 11/00; F01N 13/008; F01N 2550/02; F01N 2560/024; F01N 2560/025; F01N 2560/06; F01N 2900/1602; F01N 2430/06; F01N 11/007; F01N 2560/14; F01N 2900/0601; F01N 2900/08; F01N 2900/1626; F01N 3/101; Y02T 10/12; Y02T 10/40
See application file for complete search history.

(56) References Cited

U.S. PATENT DOCUMENTS

2017/0074214 A1\*    3/2017    Chiu ..................... F02D 41/008
2017/0333843 A1\*   11/2017    Aoyagi .................. F02D 19/08

FOREIGN PATENT DOCUMENTS

WO    2017149304    9/2017

\* cited by examiner

*Primary Examiner* — Brandon D Lee
(74) *Attorney, Agent, or Firm* — Burris Law, PLLC

(57) ABSTRACT

An internal combustion engine arrangement includes an internal combustion engine, a catalytic converter, and a controller. The controller is configured to determine a maximum $H_2$ production capacity of the catalytic converter. The catalytic converter is arranged downstream of the internal combustion engine. The controller is configured and adapted to determine the maximum $H_2$ production capacity of the catalytic converter based on a first function that correlates an $H_2$ production of the internal combustion engine with first internal combustion engine parameters.

9 Claims, 2 Drawing Sheets

INTERNAL COMBUSTION ENGINE ARRANGEMENT

CROSS-REFERENCE TO RELATED APPLICATIONS

This application claims priority to and the benefit of German Patent Application Number 102021001612.2 filed on Mar. 29, 2021. The disclosure of the above application is incorporated herein by reference.

FIELD

The present disclosure relates to an internal combustion engine arrangement for determining a maximum $H_2$ production capacity of a catalytic converter of the internal combustion engine arrangement.

BACKGROUND

The statements in this section merely provide background information related to the present disclosure and may not constitute prior art.

Published PCT Application WO 2017/149304 discloses an internal combustion engine arrangement having a catalytic converter, wherein the catalytic converter produces $H_2$ during operation.

SUMMARY

This section provides a general summary of the disclosure and is not a comprehensive disclosure of its full scope or all of its features.

According to the present disclosure, an internal combustion engine arrangement for determining a maximum $H_2$ production capacity of a catalytic converter of the internal combustion engine arrangement comprises an internal combustion engine, a catalytic converter and a controller for determining a maximum $H_2$ production capacity of the catalytic converter. The catalytic converter is arranged downstream of the internal combustion engine. The controller is configured and adapted for determining the maximum $H_2$ production capacity of the catalytic converter by taking into account an $H_2$ production of the internal combustion engine using a first function. The first function correlates an $H_2$ production of the internal combustion engine and first internal combustion engine parameters to one another.

As a result of the first function correlating an $H_2$ production of the internal combustion engine with first internal combustion engine parameters and these being taken into account for determining the maximum $H_2$ production capacity of the catalytic converter, it is possible to determine a precise combustion air ratio for the internal combustion engine arrangement which takes into account the $H_2$ production of the internal combustion engine.

First internal combustion engine parameters comprise an engine speed of the internal combustion engine, a torque which is supplied by the internal combustion engine, a temperature of the internal combustion engine, an ignition timing relative to an optimal ignition timing and/or a camshaft position.

In one form, the internal combustion engine arrangement comprises a first $\lambda$ sensor for determining a first $\lambda$ value and a second $\lambda$ sensor for determining a second voltage. The first $\lambda$ sensor is arranged downstream of the internal combustion engine and upstream of the catalytic converter. The second $\lambda$ sensor is arranged downstream of the catalytic converter.

The controller is configured and adapted for determining the maximum $H_2$ production capacity by taking into account a second function. The second function correlates the $H_2$ production of the internal combustion engine determined using the first function, first internal combustion engine parameters, a first temperature of the catalytic converter, the first $\lambda$ value of the internal combustion engine and a characteristic behavior of the second $\lambda$ sensor to determine an expected reference voltage for the second $\lambda$ sensor.

A first temperature of the catalytic converter comprises a temperature of the catalytic converter while the internal combustion engine is operated with the first internal combustion engine parameters.

A first $\lambda$ value of the internal combustion engine comprises a combustion air ratio determinable by the first $\lambda$ sensor.

A characteristic behavior of the second $\lambda$ sensor comprises a function for the second $\lambda$ sensor which correlates a voltage measured by the $\lambda$ sensor and a combustion air ratio.

Taking the second function into account makes it possible to determine a precise combustion air ratio for the internal combustion engine, wherein not only the $H_2$ production of the internal combustion engine but also an $H_2$ production of the catalytic converter is taken into account.

In addition, taking into account the $H_2$ production of the internal combustion engine and the maximum $H_2$ production of the catalytic converter makes it possible to determine an aging condition of the catalytic converter.

In addition, taking into account the $H_2$ production of the internal combustion engine, the maximum $H_2$ production of the catalytic converter and/or the $H_2$ production of the catalytic converter makes it possible to improve an existing strategy for scavenging the catalytic converter by reference to the current $H_2$ production capacity.

In addition, taking into account the $H_2$ production of the internal combustion engine, the maximum $H_2$ production of the catalytic converter and/or the $H_2$ production of the catalytic converter makes it possible to detect faults in the operation of the first $\lambda$ sensor.

The dependent claims describe advantageous forms of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Figure 1:
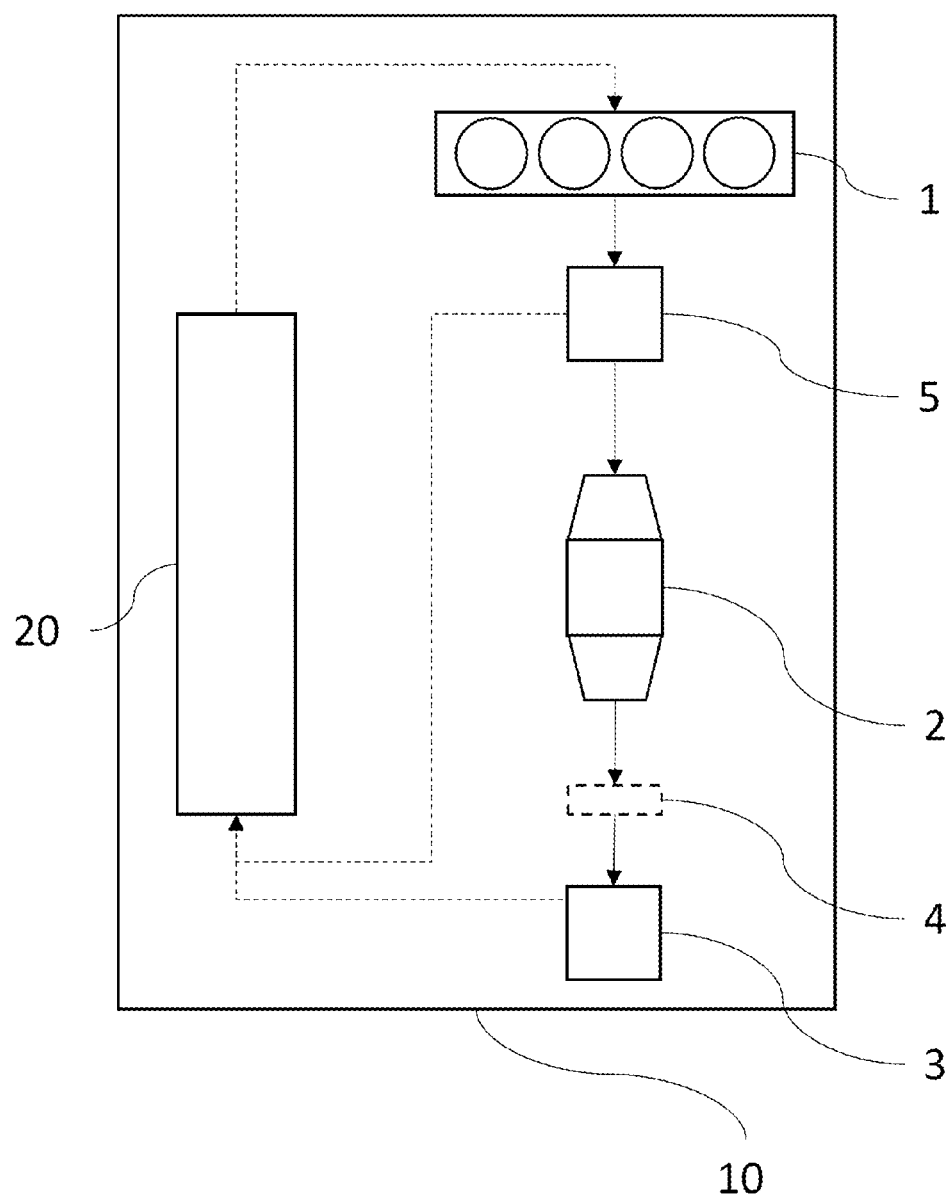
FIG. 1 is a schematic diagram of an exemplary form of an internal combustion engine arrangement according to the present disclosure.

The following description is merely exemplary in nature and is not intended to limit the present disclosure, applica- FIG. 1 shows an exemplary form of an internal combustion engine arrangement 10 for determining a maximum $H_2$ production capacity 40a of a catalytic converter 2 of the internal combustion engine arrangement 10. The internal combustion engine arrangement 10 comprises an internal combustion engine 1, a catalytic converter 2 and a controller 20 for determining a maximum $H_2$ production capacity 40a of the catalytic converter 2. The internal combustion engine arrangement 10 further comprises a first λ sensor 5 for determining a first λ value 50 and a second λ sensor 3 for determining a second voltage 53a, 53b.

The catalytic converter 2 is arranged downstream of the internal combustion engine 1. The first λ sensor 5 is arranged downstream of the internal combustion engine 1 and upstream of the catalytic converter 2. The second λ sensor 3 is arranged downstream of the catalytic converter 2.

The internal combustion engine arrangement 10 thus corresponds to an internal combustion engine arrangement as employed in a great many vehicles. This provides that an exemplary form of the internal combustion engine arrangement 10 may be readily employed for existing vehicles without any need to undertake, in particular, hardware adaptations to the vehicles.

In this exemplary form, the catalytic converter 2 is a three-way catalytic converter. The internal combustion engine 1 is a gasoline engine.

Figure 2:
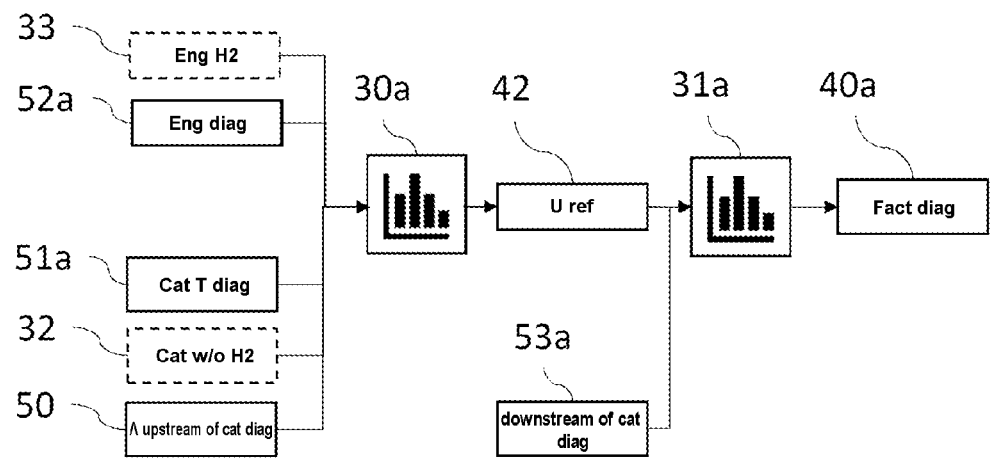
FIG. 2 is a flowchart illustrating a method for determining the maximum $H_2$ production capacity of a catalytic converter of the internal combustion engine arrangement.

FIG. 2 shows an exemplary form of the controller 20.

The controller 20 is configured and adapted for determining the maximum $H_2$ production capacity 40a of the catalytic converter 2 by taking into account an $H_2$ production of the internal combustion engine 1 using a first function 33 which correlates an $H_2$ production of the internal combustion engine 1 with first internal combustion engine parameters 52a.

In this exemplary form, the internal combustion engine 1 is operated in a rich operation. This makes it possible to perform a diagnosis for the internal combustion engine arrangement 10.

In this exemplary form, the first internal combustion engine parameters 52a comprise a correlation between an engine speed of the internal combustion engine 1 and a torque that can be supplied by the internal combustion engine 1. The internal combustion engine parameters 52a are in the form of a map. An adjustment of the first internal combustion engine parameters 52a is carried out once per vehicle journey.

To determine the maximum $H_2$ production capacity 40a, a second function 30a is taken into account. The second function 30a correlates the $H_2$ production of the internal combustion engine 1 determined using the first function 33, first internal combustion engine parameters 52a, a first temperature 51a of the catalytic converter 2, the first λ value 50 of the catalytic converter 2 and a characteristic behavior 32 of the second λ sensor 3 to determine an expected reference voltage 42 for the catalytic converter 2. The first internal combustion engine parameters 52a, the first temperature 51a of the catalytic converter 2, the first λ value 50 of the catalytic converter 2 and the characteristic behavior 32 of the second λ sensor 3 are here referred to as input parameters for the second function.

In this exemplary form, the second function 30a assigns the recited input parameters an expected reference voltage 42 for a catalytic converter in volts, wherein this second function takes into account an $H_2$ production of the internal combustion engine 1 but does not take into account an $H_2$ production of the catalytic converter 2.

In this exemplary form, the first temperature 51a of the catalytic converter 2 is simulated by the controller 20 using a model. This makes it possible to dispense with a temperature sensor 4 for determining the first temperature 51a of the catalytic converter 2. This allows a reduction in production costs for the internal combustion engine arrangement 10.

In an alternative form, the internal combustion engine arrangement 10 comprises a temperature sensor 4 for determining a temperature of the catalytic converter 2. This makes it possible to dispense with determination of catalytic converter temperatures on the basis of a model and to measure temperatures of the catalytic converter 2 directly.

The controller 20 is configured and adapted for determining the maximum $H_2$ production capacity 40a by taking into account a third function 31a. The third function 31a correlates the expected reference voltage 42 of the second λ sensor 3, determined using the second function 30a, and the second voltage 53a of the second λ sensor 3.

In this exemplary form, the third function 31a is obtained by subtraction of the expected reference voltage 42 from the second voltage 53a.

Figure 3:
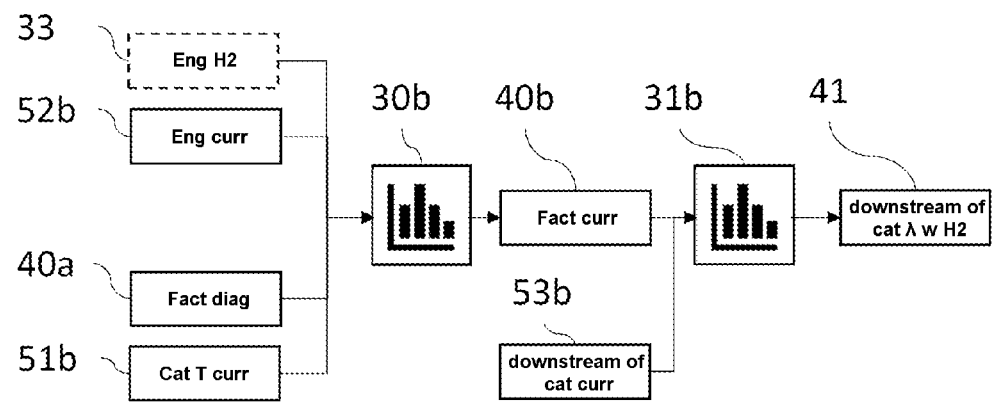
FIG. 3 is a flowchart illustrating another method for determining a value using the maximum $H_2$ production capacity of the catalytic converter.

FIG. 3 shows a further exemplary form of the controller 20. The controller 20 is configured and adapted for determining a precise second λ value 41 for the second λ sensor 3 using the maximum $H_2$ production capacity 40a.

This makes it possible to increase a conversion capacity of the catalytic converter 2, thus advantageously reducing emissions from the internal combustion engine arrangement 10 during operation.

The controller 20 is configured and adapted for determining the precise second λ value 41 for the second λ sensor 3 by taking into account a fourth function 30b. The fourth function 30b correlates the $H_2$ production of the internal combustion engine 1 determined using the first function 33, second internal combustion engine parameters 52b, a second temperature 51b of the catalytic converter 2 and the maximum $H_2$ production capacity 40a to determine a current $H_2$ production capacity 40b.

In this exemplary form, the two internal combustion engine parameters 52b are determined via a current and regular operation of the internal combustion engine 1. The second temperature 51b of the catalytic converter 2 corresponds to a temperature of the catalytic converter 2 established during current and regular operation of the internal combustion engine arrangement 10 with the second internal combustion engine parameters 52b.

Accordingly, the actual $H_2$ production capacity 40b is an $H_2$ production capacity established upon operation of the internal combustion engine arrangement 10 with the second internal combustion engine parameters 52b.

The controller 20 is configured and adapted for determining the precise second λ value 41 by taking into account a fifth function 31b. The fifth function 31b correlates an actual voltage 53b of the second λ sensor 3 and the actual $H_2$ production capacity 40b.

In this exemplary form, the fifth function 31b is configured in the form of a map.

The controller 20 determines the precise second λ value 41 from the function 31b. This makes it possible to provide that the operation of the internal combustion engine arrangement 10 conforms to current legislation which stipulates determination of the second λ value 41 with an accuracy of +1-0.1%.

The controller 20 is configured and adapted for determining an aging condition of the catalytic converter 2 by reference to the maximum $H_2$ production capacity 40a.

In this exemplary form, an oxygen storage capacity of the catalytic converter 2 is taken into account for determining the aging condition. In this form, the oxygen storage capacity is determined in a conventional manner.

In this exemplary form, the maximum $H_2$ production capacity 40a and the conventionally determined oxygen storage capacity are direct inputs into the aging condition determined.

In this exemplary form, the controller 20 determines a heating strategy for the catalytic converter 2 by reference to the determined aging condition of the catalytic converter 2.

In this exemplary form, a precise light off temperature of the catalytic converter 2 for each cold start of the internal combustion engine 1 is determined by reference to the maximum $H_2$ production capacity 40a and the determined oxygen storage capacity. The temperature of the catalytic converter 2 is then adjusted by alteration of the second internal combustion engine parameters 52b. This makes it possible to significantly reduce a fuel consumption for operation of the internal combustion engine 1.

The controller 20 is configured and adapted for improving an existing strategy for scavenging the catalytic converter 2 by reference to the current $H_2$ production capacity 40b.

The existing strategy for scavenging the catalytic converter 2 provides for at least complete scavenging of the catalytic converter 2 after each overrun fuel cut-off phase. The improved strategy provides for rich operation of the internal combustion engine 1 only until the catalytic converter 2 is completely scavenged but not beyond this point. This allows for a significant reduction in emissions during operation of the internal combustion engine 1.

The controller 20 is configured and adapted for detecting errors in the operation of the first $\lambda$ sensor 5 by reference to the precise second $\lambda$ value 41.

The precise second $\lambda$ value 41 allows direct detection of errors in the operation of the first $\lambda$ sensor 5.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An internal combustion engine arrangement comprising:
    an internal combustion engine;
    a catalytic converter;
    a first lambda ($\lambda$) sensor configured to determine a first $\lambda$ value;
    a second $\lambda$ sensor configured to determine a second voltage; and
    a controller configured to determine a maximum hydrogen ($H_2$) production capacity of the catalytic converter,
    wherein the catalytic converter is arranged downstream of the internal combustion engine,
    wherein the controller is configured to determine the maximum $H_2$ production capacity of the catalytic converter based on a first function that correlates an $H_2$ production of the internal combustion engine with first internal combustion engine parameters,
    wherein the first $\lambda$ sensor is arranged downstream of the internal combustion engine and upstream of the catalytic converter and wherein the second $\lambda$ sensor is arranged downstream of the catalytic converter, and
    wherein the controller is configured to determine the maximum hydrogen ($H_2$) production capacity based on a second function that correlates the $H_2$ production of the internal combustion engine determined using the first function, the first internal combustion engine parameters, a first temperature of the catalytic converter, the first $\lambda$ value of the internal combustion engine and a characteristic behaviour of the second $\lambda$ sensor to determine an expected reference voltage for the second A sensor.

2. The internal combustion engine arrangement according to claim 1, wherein the controller is configured to determine the maximum $H_2$ production capacity by based on a third function that correlates the expected reference voltage for the catalytic converter, determined using the second function, and the second voltage of the second $\lambda$ sensor.

3. The internal combustion engine arrangement according to claim 2, wherein the controller is configured to determine an aging condition of the catalytic converter by reference to the maximum $H_2$ production capacity.

4. The internal combustion engine arrangement according to claim 2, wherein the controller is configured to determine a second $\lambda 0$ value for the second $\lambda$ sensor using the maximum $H_2$ production capacity.

5. The internal combustion engine arrangement according to claim 4, wherein the controller is configured to detect errors in the operation of the first $\lambda$ sensor by reference to the second $\lambda$ value.

6. The internal combustion engine arrangement according to claim 4, wherein the controller is configured to determine the second $\lambda$ value for the second $\lambda$ sensor based on a fourth function that correlates the $H_2$ production of the internal combustion engine determined using the first function, second internal combustion engine parameters, a second temperature of the catalytic converter and the maximum $H_2$ production capacity to determine a current $H_2$ production capacity.

7. The internal combustion engine arrangement according claim 6, wherein the controller is configured to improve an existing strategy for scavenging the catalytic converter by reference to the current $H_2$ production capacity.

8. The internal combustion engine arrangement according to claim 6, wherein the controller is configured to determine the second $\lambda$ value based on a fifth function that correlates an actual voltage of the second $\lambda$ sensor and an actual $H_2$ production capacity.

9. The internal combustion engine arrangement according to claim 8, wherein the second function, the third function, the fourth function and/or the fifth function show cross-sensitivities of hydrocarbons of the second $\lambda$ sensor.

* * * * *